June 30, 1964 W. F. RETHWISH ETAL 3,139,512
CORE LOWERING APPARATUS FOR FABRICATING HONEYCOMB CORE
Filed Feb. 26, 1963 5 Sheets—Sheet 1
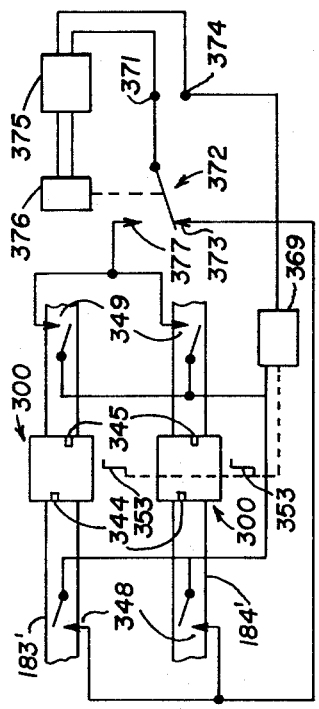
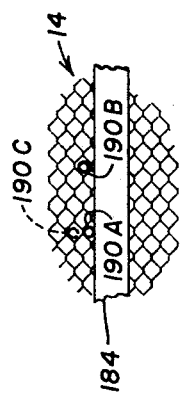
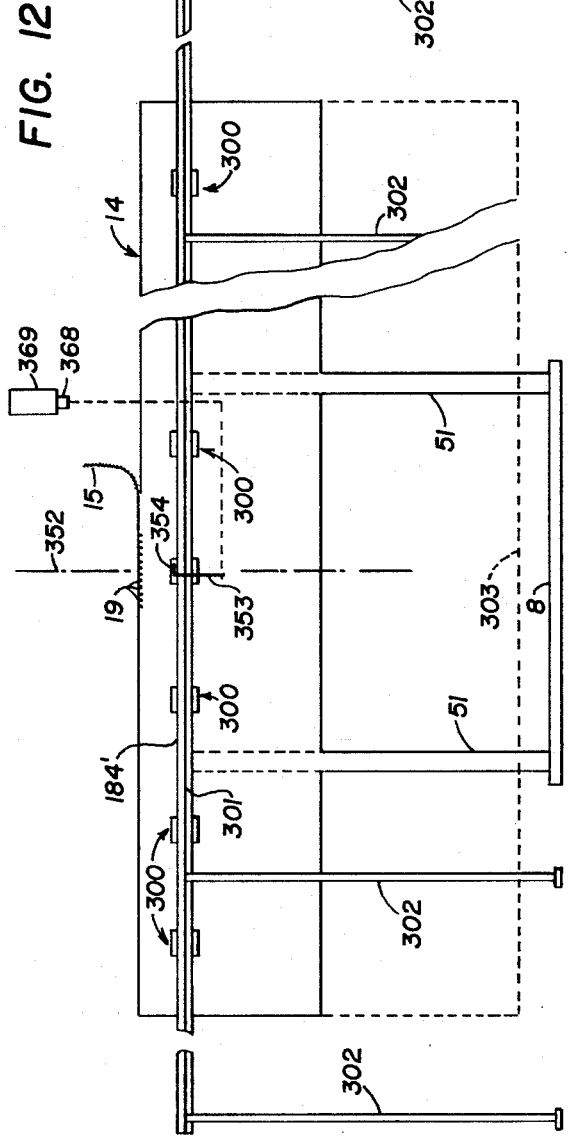
INVENTORS.
W. F. RETHWISH
D. S. HARDING
K. W. MAYNARD
C. H. EASLEY
BY George E. Pearson
ATTORNEY

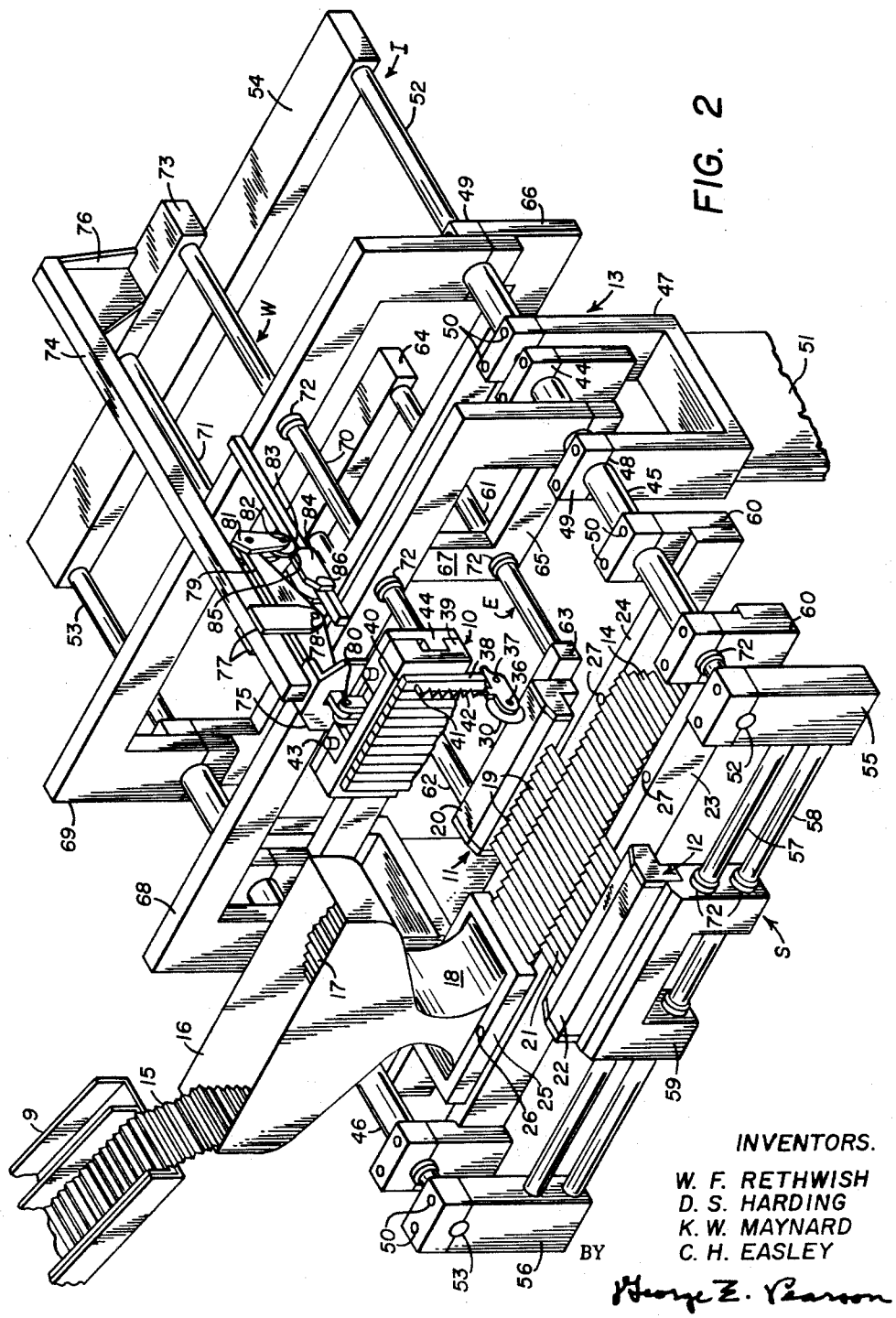

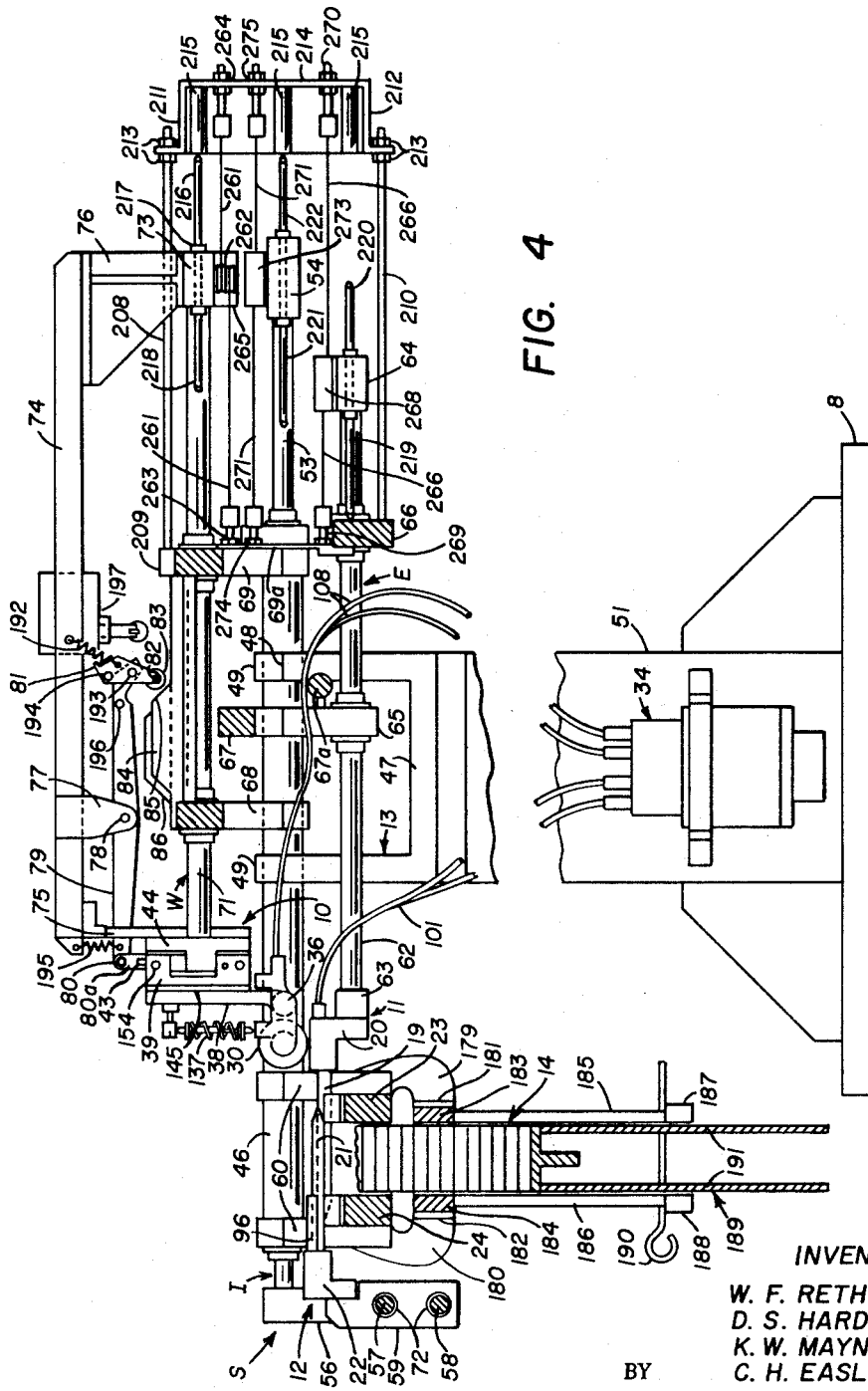

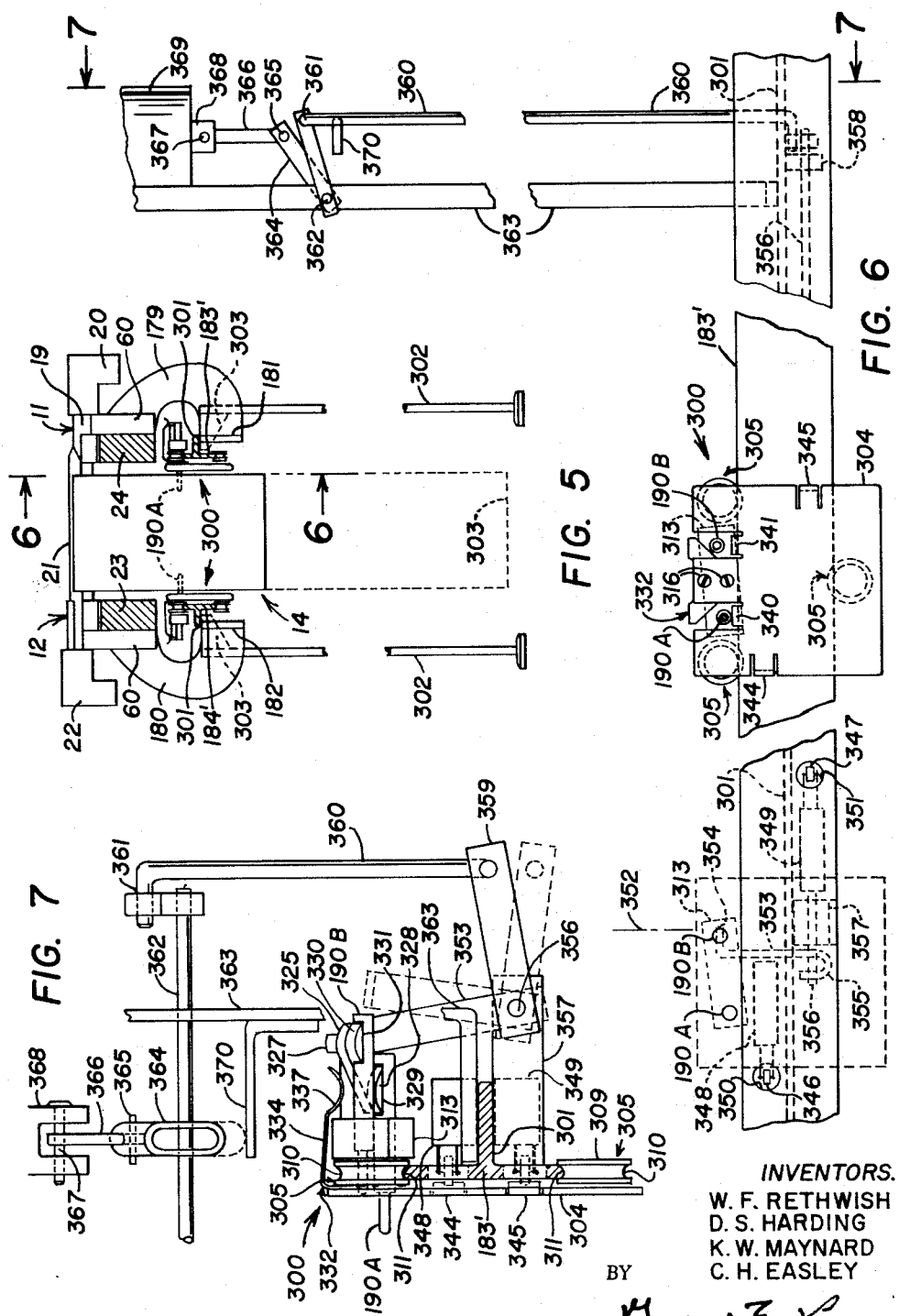

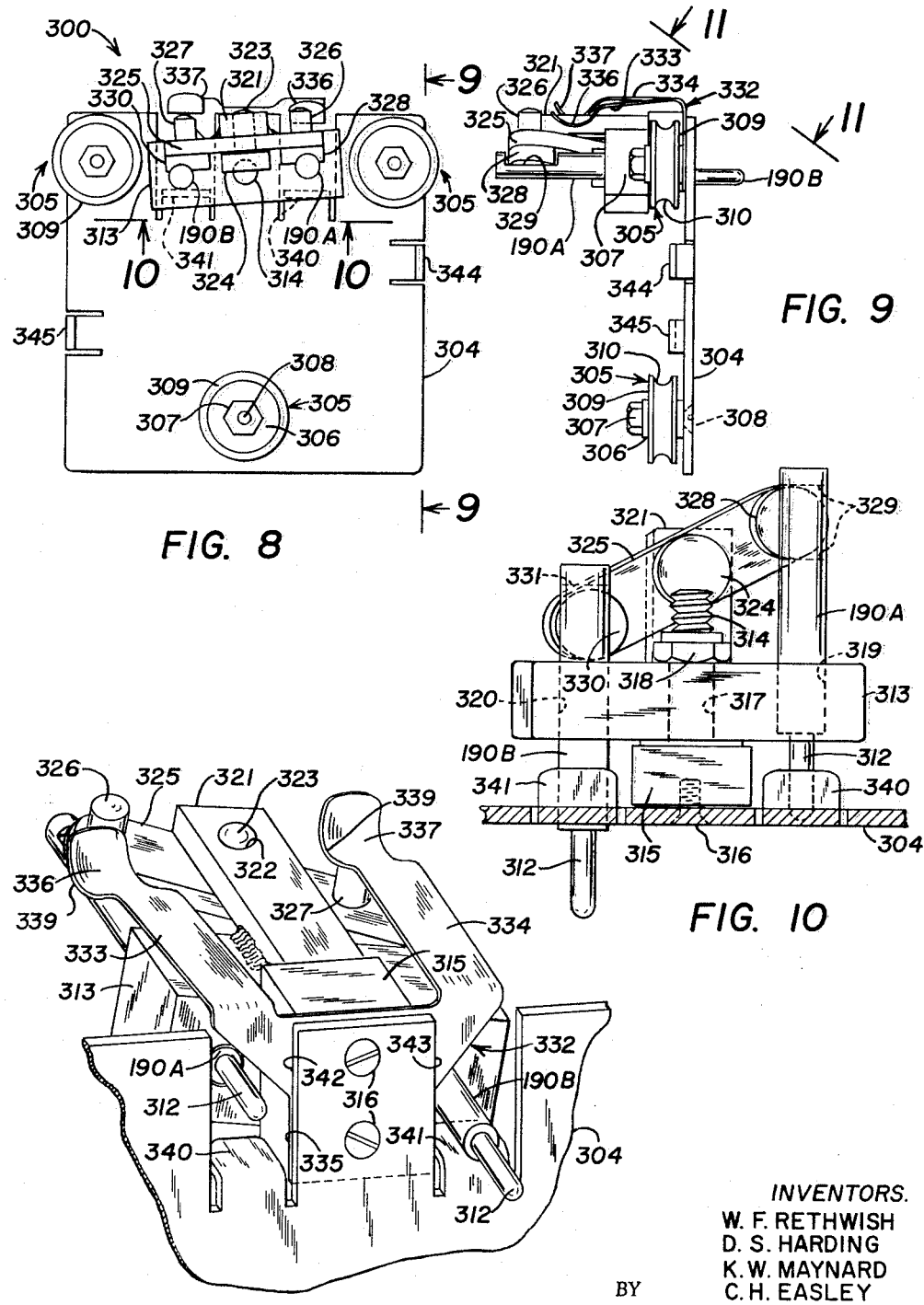

3,139,512
CORE LOWERING APPARATUS FOR FABRICATING HONEYCOMB CORE
William F. Rethwish, National City, Dale S. Harding, Chula Vista, Kermit W. Maynard, National City, and Charles H. Easley, Chula Vista, Calif., assignors to Rohr Corporation, Chula Vista, Calif., a corporation of California
Filed Feb. 26, 1963, Ser. No. 261,572
8 Claims. (Cl. 219—82)

This invention relates generally to the fabrication of honeycomb core from corrugated metallic ribbon and more particularly to new and improved apparatus for lowering the core layer by layer with respect to internesting electrode and indexing pins.

Although not limited thereto, the invention has particular utility when used with the basic welding pin, wheel, and core shuttling movements disclosed and claimed in the copending application of Fred H. Rohr for Method and Apparatus for Fabricating Honeycomb Core, Serial No. 846,903, filed October 15, 1959, now Patent No. 3,079,487.

In using these basic movements of the aforesaid copending application to form honeycomb core of unlimited length, a continuous corrugated metallic ribbon is doubled back and forth upon itself to form the successive layers of cells of the core, and the core is shuttled along its length in increments of cells and alternately in opposite directions from layer to layer. Horizontally disposed and internesting electrode and indexing pins, which are relatively few in number compared to the number of cells extending along the length dimension of the core, comprise a work station where the ribbon section being added to the core is welded thereto. The internesting electrode and indexing pins juxtapose the confronting ribbon sections so that their aligned and abutting nodes are supported on the electrode pins. The confronting ribbon sections are held in this position while welding wheels pass over the abutting nodes and, in coaction with the electrode pins, pass the welding current therebetween and through the abutting nodes to weld the same together and thus form the cells of the honeycomb core. Following each such welding operation, the electrode pins are withdrawn from the core and the same is shuttled by the indexing pins to either side of the electrode pins, depending upon the direction of feed of the continuous ribbon to the core. The electrode pins then move back into the core as the indexing pins are withdrawn therefrom, and the indexing pins thereafter are returned to internesting relation with respect to the electrode pins. In this position, the indexing pins lie beneath the new section of ribbon which has been drawn by the shuttled core into a position of alignment and abutment of its nodes with those of the core disposed above and supported on the electrode pins. These welding and shuttling operations are repeated until an end of the core is reached at which time, following welding of the aligned and abutting nodes thereat, both electrode and indexing pins are withdrawn from the core, to permit the same to be lowered diagonally by one-half cell width downwardly and by one-half cell width longitudinally in the reverse indexing direction, thereby to ready the core for re-entry of the electrode pins into the newly formed group of cells in the upper layer of cells of the core.

Considering further the nature of the aforedescribed basic core movements, the core is at all times, except for the time of lowering of the same, supported by either or both of the electrode and indexing pins from which it depends in the region of the welding and shuttling of the core, i.e., at the work station of the machine. Accordingly, in the arrangement of the copending application aforesaid, additional support for the core is provided by pins which enter the core several cells down from the upper layer of cells of the core, and these pins slide along on tracks which extend along opposite sides of the core and over its path of travel to each side of the work station. These pins are employed in pairs, one of which bears against the track and the other of which is disposed within the next row of cells above the track such that on withdrawing the lower pin, the core moves by gravity to seat the other pin on the track, after which the first pin is then inserted in what, at that time, becomes the next row of cells above the track.

In one core lowering arrangement of the copending application aforesaid, these pins are solenoid actuated, and at the time of lowering of the core in an end position thereof, all of the pins arranged in core supporting relation along the tracks are withdrawn simultaneously to thus lower the core as a unit and over its length. In this arrangement, each pair of pins is supported on a rocker device which slides along the track and supports the solenoid actuators for the pins such that the withdrawn pin of each pair is moved into alignment with the next row of cells above the track as the core lowers to its new position of support on the track and, upon de-energization of the solenoid, its retracted pin re-enters the core.

In an alternative core lowering arrangement of the copending application aforesaid, the core support pins are manipulated manually by an operator in attendance at the work station. Following each shuttling movement of the core through the work station, the operator pulls the lower support pin and reinserts it in the next row of cells above that in which the other pin of the pair is inserted. As the core moves down the track upon successive shuttling movements, the core gradually lowers under gravity until the lower pin of the pair of support pins becomes seated in core supporting relation on the track.

While the aforedescribed core shuttling and lowering arrangements are generally satisfactory and give satisfactory results, particularly in fabricating blocks of core of moderate size, the frictional drag of the pin support rockers or of the support pins on the track, as the case may be, and the inherent instability and lack of rigidity of the core in its length and width dimensions, are factors which make shuttling and lowering movements of the core as a unitary structure increasingly more difficult when core blocks of more than moderate size are to be fabricated.

In accordance with the arrangement of the present invention for shuttling and lowering a block of honeycomb core layer by layer with respect to internesting electrode and indexing pins located at the work station for fabricating the core, a pair of tracks are extended along the shuttle path on opposite sides of the core, and a number of wheel supported pin carriers are mounted on the tracks for rolling movement therealong. Each of the pin carriers comprises a pair of pins movably supported thereon and movable conjointly into and out of the cells of the core to support the same.

Means disposed at the work station is employed to drive one of the pins of each of the carriers into the core as the carrier passes through the work station. The movement of the pins conjointly into and out of the core is accompanied by simultaneous upward and downward movements of the pins relative to each other sufficient to lower the core by one layer or through a distance of one-half cell width. Spring means is employed for urging each pin downwardly as the same is driven into the core.

In order to accomplish the aforedescribed driving movement of the pins into the core, first and second pairs of switches are employed, there being one such pair mounted on each track. The switches of each pair are disposed in spaced relation along their supporting track and on opposite sides of the centerline through the work station. Each of the carriers has a pair of switch actuators for respective engagement with the spaced switches on their common track. Each switch, when activated, completes a circuit to a solenoid, providing, however, that a two position shuttle control switch is also in position to complete the circuit. The solenoid, when activated, drives a pair of hammers disposed at the centerline of the machine. These hammers are associated respectively with the pair of tracks such that the retracted carrier pins, when the same are positioned at the centerline, are driven by the hammers into the core.

The shuttle switch is alternated between its two positions as the direction of shuttling of the core is changed and, thus, although the switch actuators on the carriers are effective to close their respective track switches upon engagement therewith in either direction of core movement, the circuit arrangement of the track switches and the shuttle control switch is such that only the actuators associated with the retracted pins are effective to complete the circuit to the solenoid.

When the carriers on the two tracks are aligned such that their corresponding pins are inserted in the same cell of the core, track switches are required on one of the tracks only, since driving connections are provided for driving the hammers for the two tracks simultaneously from the solenoid which thus need be actuated only by closure of a track switch on one of the tracks.

It is an object of the present invention, therefore, to provide improvements in the means for shuttling and lowering a block of honeycomb core during the fabrication thereof.

Another object, in a process of fabricating honeycomb core layer by layer downwardly with respect to electrode and indexing pins, is to provide an auxiliary pin support arrangement for the core which will minimize frictional drag thereon as the same is shuttled in increments over the length thereof.

Another object is to provide new and improved auxiliary pin support apparatus for the core having provision for progressively lowering the core as the same is shuttled through the work station of the machine.

Still another object is to provide a positive acting mechanism for lowering the core progressively along its length while maintaining the same effectively within the plane of the interesting pins at the work station and not withstanding the instability and lack of rigidity of the core in its length and width dimensions.

Still another object is to provide a pin supporting core lowering apparatus having provision for yieldably driving the core layer by layer downwardly as the electrode and indexing pins release the core for lowering movement, thereby substantially obviating the dependency on gravity to effect such lowering movements.

An additional object is to provide core lowering apparatus which may simply be actuated electrically by means of a single control.

Yet another object is to provide electrically controlled core lowering apparatus which is effective to lower the core progressively as the same is shuttled in either direction over the length thereof.

These and additional objects, features and advantages of the present invention are accomplished in accordance with the core lowering apparatus hereinafter more fully to be described with reference to the accompanying drawings and wherein a plurality of wheel supported pin carriers are employed in spaced relation along the length of the core for movement on track supports therefor, each carrier being provided with a solenoid actuated rocker mechanism for yieldably shifting its pins to lower the core section engaged thereby as each carrier is moved by the core into a position for actuation by a solenoid driven actuator common to all the carriers.

In the accompanying drawings:

FIG. 1 is a schematic view illustrating the basic core lowering principle;

FIG. 2 is an isometric view of a honeycomb core fabricating machine suitable for use with the core lowering apparatus of the present invention;

FIG. 3 is a schematic view of the core support and lowering apparatus of the present invention shown in relation to the core being fabricated;

FIG. 4 is a side elevational view, partly in section, of the machine of FIG. 2;

FIG. 5 is a fragmentary view, somewhat enlarged, of the machine of FIG. 4 and illustrating the adaptation thereof to the core lowering apparatus of the present invention;

FIG. 6 is an enlarged view of the core lowering apparatus as seen along the line 6—6 of FIG. 6;

FIG. 7 is a somewhat enlarged fragmentary view of the apparatus as seen along the line 7—7 of FIG. 6;

FIG. 8 is an outside view of a wheel supported pin carrier of the present invention;

FIG. 9 is an end view of the pin carrier taken along the line 9—9 of FIG. 8;

FIG. 10 is a plan view of the pin rocker mechanism as viewed along the line 10—10 of FIG. 8;

FIG. 11 is an isometric view of the spring rocker mechanism as viewed along the line 11—11 of FIG. 9; and FIG. 12 is a wiring diagram for the pin carrier actuated switches.

Referring now to the drawings for a more complete understanding of the invention, and first more particularly to FIGS. 2 and 4, there is shown thereon a honeycomb core fabricating machine which is functionally equivalent to that disclosed and claimed in the aforesaid copending application of Fred H. Rohr, Serial No. 846,903, that is to say, both machines have the same basic components and the same basic movements. Thus, both machines comprise a welding wheel assembly or welding head generally designated 10, an electrode pin assembly 11, an indexing pin assembly 12, and a supporting framework generally designated 13.

A core in the process of fabrication on the machine is generally designated 14 and is built up from an endless corrugated ribbon 15 which is supplied from a source (not shown) such as the strip feed and corrugating apparatus disclosed and claimed in the copending application of Elbert M. Lacey, Jr. for Method and Apparatus for Feeding Metal Strips, Serial No. 78,720, filed December 27, 1960. The ribbon so supplied is received by way of a suitable chute or slide 9 and a wine glass shaped feed control device 16 which forms a hopper in its upper portion into which the ribbon 15 may fall into one or more loops such as indicated at 17. Feed control device 16 also has a narrowed throat portion 18 providing a restricted opening which approximates the thickness of the corrugated ribbon, that is to say, the dimension corresponding to the depth of a trough or the height of a crest, as the case may be. The restricted opening serves to keep the ribbon supplied to the core under sufficient tension, short of stretching and deforming the same, such that the ribbon nodes fall naturally into alignment with the confronting nodes of the previously formed core layer. On leaving the throat 18, the ribbon is fed and guided outwardly of the device 16 through the open bottom thereof in either direction longitudinally of the core and into what becomes the upper layer of the core as the same is shuttled in either direction to the right or to the left of the machine.

The electrode pins 19 move axially into and out of what constitutes the upper row of completed cells of the core 14, and the indexing pins 21 move axially into or out of what constitutes those cells which are being newly added to the core upon welding of the ribbon 15 thereto.

Electrode pins 19 which in the specific case, as shown, may be 12 in number, are precisely formed and precisely mounted and spaced in a header member 20 to which they are suitably secured. Indexing pins 21, which in the specific case are 13 in number, are similarly formed and precisely spaced and mounted in a header member 22 comprising the indexing pin assembly 12.

Electrode pins 19 lie generally within the plane of the cells of the core 14 formed by the previous welding thereto of a length of ribbon 15 extending along the length of the core. The indexing pins 21 are disposed in internesting relationship with the electrode pins 19 and are disposed generally in a plane spaced one-half cell width above the plane common to the electrode pins. As otherwise expressed, the indexing pins are disposed generally in a plane of those cells which are being newly added to the core to form the upper layer of cells thereof.

Both of the electrode and indexing pins are mounted for movement axially thereof into and out of the cells of core, and the electrode pins when so inserted into the core, are in supporting relation with respect thereto, the core being depended from these pins and supported, at least in part, therefrom. The indexing pins 21, on the other hand, when inserted into position on the core, are disposed beneath a section of the corrugated ribbon 15 which is to be welded to the core and, consequently, do not initially provide a support function for the core. When the welding of this ribbon section has been completed and the same is secured to the core, and when the electrode pins have been withdrawn axially from the core, the core is then supported by the indexing pins such that the core may be shuttled by movement of the indexing pin assembly 12 to the right or to the left, as the case may be.

With the parts in the positions as shown in FIG. 2, the machine is so set up that upon being set in operation, the core 14 would be shuttled in successive increments of 12 cells each to the right. Assuming, for example, that the welding wheel assembly 10 has just returned from a sweep across the ribbon section disposed above the pins 19 and 21 such that this ribbon section has been welded to the core, the electrode pins 19 are then withdrawn from the core, or may have been withdrawn from the core upon the return sweep movement of the welding wheel assembly 10. On removal of the electrode pins 19 from the core, the same is supported by the indexing pins 21 and may be shuttled to the right as a unit with the indexing pin assembly 12. On shuttling the core, an additional length or section of ribbon 15 is withdrawn from the feed control device 16 and assumes a position of alignment with the confronting nodes of the corresponding section of the upper ribbon of the core. The electrode pins are then reinserted into the core beneath the last mentioned ribbon section, following which the indexing pins are withdrawn axially from the core and the assembly 12 returned to the area of the welding station. The indexing pins are then inserted beneath the newly superimposed section of ribbon 15 which is to be welded to the core in the next cycle of operation of the welding machine.

When the core has been shuttled completely to the right such that the last core section of increment of cells at the extreme left end of the core have been formed at the welding station, both sets of electrode and indexing pins 19 and 21 are withdrawn axially from the core and the core is lowered by one-half cell width and shuttled by one-half cell width in the reverse direction following which the pins are again inserted into the aligned and confronting cells of the core. The wine glass control device 16 is then moved from the position shown to the right side of pins 19 and 21 into a position comparable to that disclosed on the left side of the pins, that is to say, device 16 will be similarly supported on stripper bars 23 and 24 between which the core 14 builds up layer by layer as the same is lowered one-half cell width at a time from the pins 19 and 21. The base 25 of device 16 carries a pair of spaced dowel pins 26 which are adapted to be received in openings 27 in stripper bars 23 and 24 to assure proper positioning of the device 16 on the stripper bars on either side of the pins 19 and 21.

As the device 16 is moved to the right side of the pin assemblies, an additional length of the ribbon 15 is withdrawn therefrom and doubled back over that portion which has just previously been welded to the core, and this new section of ribbon falls naturally into alignment therewith, node for node, as aforedescribed. The machine is then in position for shuttling of the core by increments to the left to add the next layer of cells to the core. When this layer has been completed, the extreme right end section of the core is positioned at the welding station and the core is again lowered one-half cell width and feed control device 16 returned to the left side of the pins 19 and 21, as shown, to thus complete an overall cycle of operations of the machine.

This overall cycle thus, by way of review, includes shuttling of the core in one direction over the length thereof to complete one row of cells of the core followed by shuttling of the core in the reverse direction and over the length thereof to form a second row of cells of the core. The core so fabricated, may be made to any desired length and may be built up row-by-row to any width within the space limitations of the environmental surroundings of the machine. When desired, moreover, the machine may be shuttled continuously in either direction and the core returned upon itself to form an endless belt.

Referring now particularly to FIG. 4, it will be seen that a pair of members 179 and 180 secured respectively at both sides of the machine to the ends of stripper bars 23 and 24, and to their associated support members 60, have angularly bent portions 181 and 182 which serve to support a pair of elongated longitudinally extending bars 183 and 184. These bars, like stripper bars 23 and 24, define a vertical channel through which the fabricated core builds up row by row of the cells of the core.

Members 185 and 186 are secured respectively to bars 183 and 184 and depend therefrom and terminate in longitudinally extending bars 187 and 188. A core support 189, such as a block of plywood, is disposed beneath the core 14 during fabrication of the first several rows of cells and is perforated in simulation of the spacing between cells to receive pins 190 which bridge the bars 187 and 188 and slide therealong as the core is shuttled from side to side. When the core has been built up sufficiently to clear the bars 183 and 184, the same may be used to support the pins 190, the board or support 189 then being removed from the machine. Pins 190 in any event provide support for the core as the same extends beyond the ends of stripper bars 23 and 24 to either side of the machine, and provide the entire support for the core as when both electrode and indexing pins 19 and 21 are withdrawn therefrom.

Support 189 alternatively may be fabricated from a light weight metal member of T cross section to which spaced sheet members 191 are secured, substantially as shown.

For further details of construction and operation of the fabricating machine hereindisclosed, reference may be had to the copending applications of Fred H. Rohr et al., filed June 29, 1962, namely, Serial No. 207,162, for Drive System for Honeycomb Core Machine, and Serial No. 207,163, for Welding System for Honeycomb Core. Reference may also be had to Patent No. 3,077,533, issued February 12, 1963, to Fred H. Rohr et al. for Novel Framework for Honeycomb Core Machine.

Referring now more particularly to FIG. 1, there is shown thereon a small section of core 14 located in the immediate vicinity of track 184 where the core is supported thereon by a pin designated 190A seated in sliding engagement on the track. In lowering the core in this arrangement, pin 190A is withdrawn and inserted in the dashed line position designated 190C. As pin 190A is withdrawn, the core lowers one-half cell width by gravity until pin 190B becomes seated on track 188. Thereafter, when pin 190B is withdrawn, the core again lowers by one-half cell width, as pin 190A, in position 190C, settles on the track.

The core lowering arrangement as disclosed in FIG. 1 is generally satisfactory for fabricating core blocks of moderate size in view of the light weight of honeycomb structures and the capability of handling the same as a unitary structure. Thus, when the core is driven as by the indexing pins, the driving forces imparted to other portions of the core remotely located relative to the indexing pins, are ordinarily sufficient to overcome the frictional drag of the pins 190 on the track. As the core blocks are fabricated to increasingly larger length, width and thickness, dimensions, however, the core becomes unstable, considered as a structural unit, and forces applied to one portion are not readily transmitted to another portion, with the result that the core may tend to compress in the region of application of the driving forces and fail to move in response thereto in remote regions of the core.

In order to reduce the frictional drag on the core to a minimum and thus render the same responsive to the shuttling drive forces, the pins 190A and 190B are supported, as hereinafter to be described more fully, on wheel supported carriers generally designated 300.

The core fabricating machine, as it appears in FIG. 4, is modified, as may best be seen in FIG. 5, to provide tracks 183′ and 184′ for the wheel supported pin carriers 300, these tracks replacing the longitudinally extending bars 183 and 184 of FIG. 4 and being supported, as before, on the members 179 and 180, and secured in any suitable manner to the angularly bent portions 181 and 182 of these members. Tracks 183′ and 184′ are generally of T-shaped cross section, and rotated in section 90° such that the tracks are supported by their leg portions 301 on the brackets 179 and 180 in the immediate vicinity of the machine, and on a plurality of upstanding supports or standards 302 arranged in spaced relation to each side of the machine, as required, along the length of the tracks, FIGS. 3 and 4. To this end, standards 302 have brackets 303, or the like, FIG. 5, for suitable supporting engagement with the tracks in the region of leg portions 301. Frame 13 of the machine itself is supported on uprights 51, in turn, secured to a base member 8 which may be suitably disposed, as at floor level. As may best be seen in FIG. 3, the core may be built up layer by layer downwardly to an extent limited only by the height of electrode pins 19 above the floor level, this being determined, in turn by the height of uprights 51 and standards 302 which in practice, are made adjustable in any suitable manner (not shown). Thus, in the arrangement shown, the core may be developed in the width direction to a width of the order of that depicted by the dashed line 303.

Tracks 183′ and 184′ may be extended to provide core of any length within the limits of space available for the shuttling movement of the core, and as many standards 302 are used for this purpose as may be required to support the core from the tracks. Thus, as depicted in FIG. 3, core 14 may have a length dimension which exceeds by many times its width dimension.

Each carrier 300 comprises a plate 304 upon which three wheel supports 305 therefor are provided, two being employed at the top of the plate and one centrally at the bottom of the plate, as best seen in FIGS. 6 and 8. Each wheel support 305 is essentially a ball bearing in which the central or hub portion 306 is fixed to plate 304 as by the nut 307 and screw 308 whose tapered head is seated in a counter sunk opening provided therefor in the plate. The wheel hub 306 and rim 309 are rotatively supported relative to each other by ball bearings (not shown) interposed therebetween in the conventional manner.

The peripheral surface of each wheel rim 309 is grooved as at 310 so as to interfit with the rounded upper or lower edge 311 of the track 183′ or 184′, as the case may be, with which it is arranged to have rolling contact, as may best be seen in FIG. 7. By reason of this arrangement, each pin carrier 300 is locked, as by its spaced wheel supports 305, in position on its track while having free rolling movement therealong. The ball bearing supported carriers 300, as thus provided for each pair of pins 190A, 190B (FIG. 6), greatly reduce the frictional drag on a core block by a ratio of the order of 16 to 1. In the case of a block of core 5 feet long and 4 feet wide, for example, a 16 pound pull was required to move the core supported with a sliding contact of the pins on track 184, as in FIG. 1, in contrast to the 1 pound pull required to move the same block of core when supported on pin support carriers 300 in rolling contact with track 184′, as in FIG. 3.

As may best be seen in FIGS. 10 and 11, pins 190A and 190B each have a reduced end portion 312 which enters the cells of the core, and which for this reason, is rounded at the tip, as shown. The cross sectional area of the reduced end portion 312 of the pins is a fraction of that of the smallest cell size of core fabricated such that relatively great freedom of movement is provided for the pin extension within the confines of the cell walls. This becomes important, as will hereinafter more fully appear as the description proceeds, when the core is still held in elevated position by the electrode and/or indexing pins after the pins 190A and 190B have been driven to lower the core.

The reduced end 312 of the pins also has the advantage that the pins 190A and 190B may be spaced apart in specific relation to the spacing between cells, or as otherwise expressed, in specific relation to the spacing between nodes and in relation to the width of the nodes. The nodes, for example, are 0.04 inch wide, being approximately 4 times the width of the welding wheels 30 in in their region of contact with the nodes. This nodal width is the same for cores of different cell sizes such, for example, as $3/16''$, $1/4''$, $3/8''$ and $1/2''$. Pins 190A and 190B, however, extend between the nodes equally well for all of these sizes. That is to say, cores of different cell sizes are supported in each case, in their nodal regions by each of pins 190A and 190B, each with its extended reduced portion 312 in supporting contact with the node of the cell in which it is inserted.

As may best be seen in FIG. 10, pins 190A and 190B are slidably carried by a rocker arm 313 which is pivotally supported on a threaded bolt screw 314 the shank of which is secured in any suitable manner to a block 315, as by being pressed into an opening provided therefor within the block. Block 115, in turn, is secured to plate 304 by a pair of screws 316 whose tapered heads are seated in countersunk openings provided therefor in the plate.

Rocker arm 313 has a central opening 317 which freely passes bolt 314 such that the arm is free to pivot on the bolt, being retained in position for pivotal movement thereon by the nut 318 threaded on bolt 314. Additional openings 319 and 320 are provided in rocker arm 313 for slidably receiving pins 190A and 190B, respectively (FIG. 10).

A member or bracket 321 is secured to rocker arm 313 and centrally thereof and extends transversely therefrom generally parallel to the axis of bolt 314. Bracket 321, at its distal end, has an opening 322 in which is freely received a pin 323 having an enlarged head 324 which is disposed, in part, within a spaced provided by removal of half of the threaded portion of bolt 314 which extends beyond the nut 318 thereon, as may best be seen in FIGS. 8 and 10.

A second rocker arm 325 has a central opening for freely passing pin 323 therethrough such that arm 325 is free to pivot thereon. Arm 325 is positioned between bracket 321 and the head 324 of pin 322 and, since head 324 is held in position by the remaining half of bolt 314, rocker arm 325 is retained in position between bracket 321 and pin head 324.

Rocker arm 325 has additional openings displaced to either side of its central opening, and these lateral openings freely receive a pair of headed pins 326 and 327 which are identical to pin 322 except that the shanks of the same are longer and extend beyond the face of rocker arm 325 for a purpose presently to appear. The enlarged head 328 of pin 326 is freely received into a longitudinal slot or recess 329 formed in pin 190A (FIG. 9), and similarly, the enlarged head 330 of pin 327 is received freely in a slot 331 formed therefor in pin 190B.

A leaf spring generally designated 332 has two branches 333 and 334 and a right angularly bent portion 335 which extends between plate 304 and block 315 and is clamped in position therebetween by screws 316, there being openings in spring portion 335 for freely passing the screws therethrough. Spring branches 333 and 334 have curved portions 336 and 337 at their distal ends which are arranged to be engaged, respectively, by the extended ends of pins 326 and 327 in a generally cam type of coaction therewith. For example, in FIGS. 8 to 11, pin 190A is shown retracted with respect to plate 304, and pin 326 is thus positioned thereby so as to be spaced from the curved portion 336 of spring branch 333, but generally in line therewith. When pin 190A is actuated so that its reduced pin portion 312 extends outwardly of plate 304, as depicted in FIGS. 5 to 7, pin 326 is moved to engage the curved portion 336 of spring branch 333 and this action loads or biasses the spring, moving the same upwardly, as viewed in FIGS. 8 and 9. When pin 326 moves past the crest 339 in the curved spring portion 336, spring branch 333 then, by reason of the energy stored therein, yieldably drives pin 336 downwardly, and this causes rocker arm 313 to rock about its pivot 314 until pin 190A bottoms on a plate portion 340, as depicted in FIG. 6, this being in the same manner in which pin 190B is shown seated on plate portion 341 in FIGS. 8, 10 and 11. The detent action of the curved portion 336 on pin 326 thus holds the same, and pin 190A in the actuated position.

When pin 190A was actuated, as heretofore described, pin 190B was driven in the opposite direction by reason of the driving connection therebetween afforded by the rocker arm 325. Thus, as pin 190B was retracted, it also moved its pin 327 against the curved portion 337 of spring branch 334, causing the spring to be loaded or biassed somewhat as pin 327 approached the crest 339 thereof. On passing the crest, however, the energy in spring branch 334 was released and the spring portion 337 moved downwardly as pin 327 moved upwardly in response to the rocking movement of rocker arm 313.

Similar action of the pin rocker and retraction mechanism takes place, as heretofore described, when pin 190B is actuated, and the description with reference to aforedescribed action of pin 190A is sufficient for both. Before considering the effect of such actions of pins 190A and 190B on the core when the same are positioned to enter the cells of the core, it should first be mentioned that plate 304 is cut away in the regions 342 and 343, FIG. 11, to provide apertures through which the pin portions 312 of pins 190A and 190B extend. Plate portions 340 and 341 extend upwardly from the bottoms of these apertures and then are bent at right angles to provide the stops for the pins, as aforementioned.

Attention is also directed to a pair of offsets 344 and 345 provided at the side edges of plate 304, FIGS. 6 to 9, which project out of the plane of the plate to the same side thereof as pin supports 340 and 341, this being best seen in FIG. 7. Offset 344 is positioned at a higher level on plate 304 than offset 345 such that when the plate is mounted on track 183' as shown in FIGS. 6 and 7, offset 344 is positioned above by 301 of the track and offset 345 is positioned on equal distance below the leg.

Offsets 344 and 345 are thus aligned with the wheeled actuators 346 and 347, respectively, of a pair of microswitches 348 and 349 which are secured to the upper and lower sides of the leg 301 of the track 183'. Actuator wheels 346 and 347 extend thru suitable openings 350 and 351 provided therefor in track 183'.

Switches 348 and 349 are positioned relative to the center line 352 of the work station of the machine such that wheel actuators 346 and 347 are spaced equal distances on opposite sides of the center line. Thus, when offset 344 moves to engage wheel actuator 346, pin 190B, as viewed in FIG. 6, is disposed substantially at center line 352. Similarly, when offset 345 moves to engage wheel actuator 347, pin 190A will be disposed substantially at the center line.

A pin actuator arm 353 has a bent or hammer portion 354 which lies generally in the horizontal plane passing through the axis of pin 190B, as viewed in FIG. 6, and as so positioned, is poised, in its dashed line position, to strike pin 190B and drive the same through plate 304, as best seen in FIG. 7. For this purpose, actuator arm 353 is secured as in its double backed end portion 355 to a rocker shaft 356 which is journalled in bearing blocks 357 and 358 secured to track 183'. The end of shaft 356 which extends beyond 358 has a crank arm 359 secured thereto, and this arm is connected by a link 360 to another crank arm 361 which, in turn, is secured to a crank shaft 362. Shaft 352 is journalled in a pair of uprights 363 (only one being shown) which are supported on tracks 183' and 184', the arrangement being such that a similar driving arrangement is secured to the opposite end of crank shaft 362 to drive a hammer to actuate the pins 190A and 190B supported on carriers 300 arranged to move on track 184', this track similarly being provided with a pair of microswitches.

Crank shaft 362 has secured thereto, an intermediate crank arm 364 which is pivotally connected, as at 365 to a rod 366, in turn, connected as at 367 to the plunger 368 of a solenoid 369. A bracket 370, secured, to upright 363 serves as a stop for the solenoid when the same is de-energized.

In operation, pin carriers 300 are employed along the core being fabricated and are mounted on the tracks 183' and 184' which are disposed on opposite sides of the core. The carriers are spaced about a foot apart along the core. At each end of the core, however, the end carrier is spaced about one half to one shuttle length from the end of the core. Thus, assuming that the carriers, as shown in FIG. 12, are at the right end of the core and are moving to the left with the core as the same is shuttled to the left, their switches 348 will be actuated (as shown in FIG. 6) at some time during the movement of the right end of the core into the work station. It will be understood that carriers 300, although shown in FIG. 12 to be more or less aligned on their tracks 183' and 184', need not be so aligned, that is, their pins 190A need not be in the same cell of the core, since each, as its offset 344 engages its associated switch 348, will energize solenoid 369 from voltage on terminal 371 by way of the arm of shuttle switch 372 in engagement with contact 373 of the switch, thence by way of an actuated one of switches 348 to solenoid 369, and thence from the solenoid to terminal 374 at the other side of the voltage source. When this occurs, solenoid 369 will drive the pin actuating arms 353 and one of their hammers will strike the pin 190B whose associated offset 345 has caused the solenoid to be energized. The other of the hammers will be ineffective in its motion unless, of course, it also is confronted at that time by a pin 190B, this being the case where the carriers on tracks 183' and 184' are aligned. When the pins are aligned, switches 348 and 349 need be employed on only one of the tracks.

Although pins 190B, during this shuttling movement, will be driven into the core and pins 190A retracted therefrom, pins 190B will not immediately lower, although being yieldably biased by spring branches 334, since the core is being held up by the indexing pins, and later also by the electrode pins upon completion of the shuttling movement to the end position.

During this shuttling movement, the shuttle counter 375, which may be a single stepper switch, energizes relay 376 from source 371, 374, to move the arm of shuttle switch 372 into engagement with its contact 377 which is connected to micro-switches 349. Thus, in the succeeding shuttle movements of the core to the right solenoid 369 will be energized from source 371, 374 through switches 349, the other side of each of which, like each of switches 348, is connected to the solenoid. During these shuttling movements, switches 348, of course, although actuated will, when engaged by offsets 344, be ineffective to energize solenoid 369 because shuttle switch 372 will be open as to these switches.

Shuttle counter 375 also operates through other circuitry (not shown) to shuttle the core by one half cell width in the reverse direction, that is, to the right, after welding of the nodes has been completed following shuttling of the core completely to the left. Following this half-cell shuttling movement of the core to the right, both the electrode and indexing pins are withdrawn from the core. At this time, the core in the vicinity of the work station, tends to lower by gravity, and is additionally yieldably driven downwardly by the energy stored in spring branches 334 acting on pins 190B. Pins 190B thus move into seated position on their stops 341 to support the core from tracks 183′ and 184′. Pins 190A meanwhile, through the action of rocker arm 313, are driven to the upper position in readiness for engagement by the hammers 354 of actuating arms 353.

As the core shuttles from left to right, as viewed in FIGS. 6 and 12, but assuming now that pins 190A are up, each time an offset 345 of a carrier 300 engages the wheel actuator 347 of a switch 349, the switch will be closed and will energize solenoid 369 through the arm of shuttle switch 372 in engagement with its contact 377. This will then cause the pin 190A to be driven into the core and pin 190B to be withdrawn therefrom. The core will be held up, however, by the electrode and indexing pins in the region of the work station, and the shifting of pins 190A and 190B will only gradually have a lowering effect on the core as the same moves outwardly and to the right of the work station. As this occurs, gravity acting on the core will tend to move it downwardly when unsupported by the electrode and indexing pins. The bias on spring branches 333, however, will yieldably urge pins 190A downwardly, and these, in turn, will provide a positive drive on the core to assure that the same has lowered over its length by the required one-half cell width by the time the core is finally lowered in its left end position at the completion of the left to right shuttling and welding operations.

While the invention here involved has been embodied in a single disclosed preferred form, it will be apparent to those skilled in the art, to which the invention most closely relates or appertains, that the same may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes that come within the meaning and range of equivalency of the claims are intended to be embraced therein.

Having thus described our invention, what we claim as new and useful and desire to secure by Letters Patent is:

1. In a core fabricating machine of the character disclosed, the combination with internesting electrode and indexing pins disposed horizontally within the work station of the machine, of auxiliary pin support means for the core comprising a pair of tracks extended along the shuttle path and on opposite sides of the core, a plurality of wheel supported pin carriers mounted for rolling movement along said tracks and having pins which enter the cells of the core to support the same, each said carrier comprising a pair of pins movable conjointly into and out of the core, and means disposed at the work station for driving one of the pins of the carrier into the core as the carrier passes through the work station.

2. In a core fabricating machine of the character disclosed, the combination with internesting electrode and indexing pins disposed horizontally within the work station of the machine, of auxiliary pin support means for the core comprising a pair of tracks extended along the shuttle path and on opposite sides of the core, a plurality of wheel supported pin carriers mounted for rolling movement along said tracks, each said carrier having a pair of pins movable conjointly into and out of the core and simultaneously movable upwardly and downwardly relative to each other when one of the pins is driven into the core, spring means for urging said one of the pins downwardly as the same is driven into the core, and means disposed at the work station for driving the retracted one of said pins into the core as its carrier passes through the work station.

3. In a core fabricating machine as in claim 2, said driving means comprising first and second pairs of switches mounted respectively on said tracks, the switches of each said pair being disposed in spaced relation along its track and to opposite sides of the centerline through said work station, first and second switch actuating means on each carrier and individual respectively to said switches on its track for actuating the switches as the carrier passes through the work station, a pair of hammers disposed substantially at said centerline of the machine and respectively adjacent said tracks for driving said retracted one of the pins into the core, and electroresponsive means arranged to be energized by said switches for actuating said hammers.

4. In a core fabricating machine as in claim 3, one of the pins on each carrier being retracted for movement of the core in one direction and the other of the pins being retracted for movement of the core in the opposite direction, and a make-break shuttling switch connected in series with the switches of each said pair of switches and movable between its make and break positions when the direction of core shuttling is reversed whereby the switch associated with the inserted one of the pins of each carrier is rendered ineffective to energize the solenoid when said last named switch is actuated upon passing through the work station.

5. In a core fabricating machine of the character disclosed, the combination with internesting electrode and indexing pins disposed horizontally within the work station of the machine, of a pair of tracks extended along the shuttle path and on opposite sides of the core, a pair of switches mounted on one of the tracks and spaced to opposite sides of the centerline through the work station, a pair of pin carriers mounted respectively on said tracks for movement therealong, each of said carriers having a pair of pins mounted for movement conjointly into and out of the core, said carriers being aligned on said tracks such that their respective pins enter the same cells of the core, a pair of switch actuating means on said one of said carriers mounted on said one of the tracks, said actuating means being respectively arranged to engage and actuate said switches as their carriers pass through the work station, a pair of hammers disposed substantially at said centerline of the machine and respectively adjacent to said tracks, said hammers being respectively aligned to strike the retracted and aligned pins of said carriers when their associated switch is actuated, a solenoid connected to said switches and arranged to be energized thereby when the same are actuated, and driving connections between said solenoid and said hammers for actuating the same to drive said retracted and aligned pins into the core.

6. In a core fabricating machine as in claim 5, one of the pins on each carrier being retracted when the core moves in one direction and the other pin being retracted when the core moves in the reverse direction, and shuttle switch means connected in series with said carrier controlled switches and operable upon reversal of the direction of core movement for preventing energization of the solenoid by the switch associated with the inserted pins.

7. In a core fabricating machine as in claim 5, said pins on each carrier being relatively movable conjointly upwardly and downwardly through a distance of one-half cell width and spring bias means for said pins for yieldably driving the same through said distance as the retracted pin is driven into the core.

8. A carrier for core-supporting pins of the character disclosed comprising, in combination, a plate, wheels on said plate for mounting the same for rolling movement along a track, a first rocker pivoted on the plate, a pair of pins slidably mounted in said rocker on opposite sides of the rocker pivot and parallel to the axis thereof, said plate having openings for passage of said pins therethrough and stops in said openings for engagement with said pins to limit movement thereof on said rocker, an arm on said rocker extended centrally of said rocker and parallel to the pivot axis thereof, a second rocker pivoted at the distal end of said arm, said second rocker having headed pins rotatively supported therein and disposed on opposite sides of said second rocker pivot and parallel to the axis thereof, said pins having longitudinal slots for respectively receiving the heads of said headed pins whereby sliding movement of one of said slotted pins conjointly drives the other of the slotted pins through said second rocker, and leaf spring means mounted on said plate and comprising a pair of spring branches engageable respectively at the distal ends thereof with said headed pins to yieldably urge the same downward and thereby rock said first rocker about its pivot.

References Cited in the file of this patent

UNITED STATES PATENTS

| | | |
|---|---|---|
| 2,634,353 | Geiszler et al. | Apr. 7, 1953 |
| 3,079,487 | Rohr | Feb. 26, 1963 |